United States Patent [19]
Aratani et al.

[11] Patent Number: 4,735,646
[45] Date of Patent: Apr. 5, 1988

[54] METHOD OF TEMPERING GLASS SHEET BY AIR QUENCHING

[75] Inventors: Shinichi Aratani; Tadashi Muramoto, both of Matsusaka City, Japan

[73] Assignee: Central Glass Company, Limited, Ube City, Japan

[21] Appl. No.: 946,051

[22] Filed: Dec. 24, 1986

[30] Foreign Application Priority Data

Dec. 27, 1985 [JP] Japan .................. 60-295344

[51] Int. Cl.$^4$ ........................................... C03B 27/04
[52] U.S. Cl. ............................. 65/114; 65/104
[58] Field of Search ........................ 65/104, 114

[56] References Cited

U.S. PATENT DOCUMENTS 3,226,215 12/1965 Beattie et al. .............. 65/114 X
4,519,829 5/1985 Spittka et al. ................... 65/114
4,578,102 3/1986 Colmon et al. ................... 65/114

FOREIGN PATENT DOCUMENTS 60-145921 8/1985 Japan .

Primary Examiner—Arthur Kellogg

Attorney, Agent, or Firm—Fleit, Jacobson, Cohn & Price

[57] ABSTRACT

The invention relates to a method of tempering a glass sheet by first suitably heating the glass sheet and quenching the heated glass sheet by directing jets of air onto both surfaces of the glass sheet from two sets of nozzles respectively protruding from oppositely disposed two air chambers. At the start of quenching, each air chamber is suddenly allowed to communicate with a source of compressed air kept at a predetermined first pressure in the range from 2 to 8 kg/cm$^2$ (gauge pressure) such that a rapid drop from the first pressure to a predetermined second pressure in the range from 0.05 to 0.5 kg/cm$^2$ (gauge pressure) takes place as the compressed air expands into the air chamber and such that substantially the whole length of the air chamber and the nozzles serves as a sort of shock wave tube. Consequently, the air jets arriving at the glass sheet surfaces at the initial stage of quenching are very high in kinetic energy and heat dissipating power. By this method even glass sheets thinner than 3 mm can be tempered so as to meet the current regulations on tempered glass sheets for use as automobile side or rear windows.

6 Claims, 1 Drawing Sheet

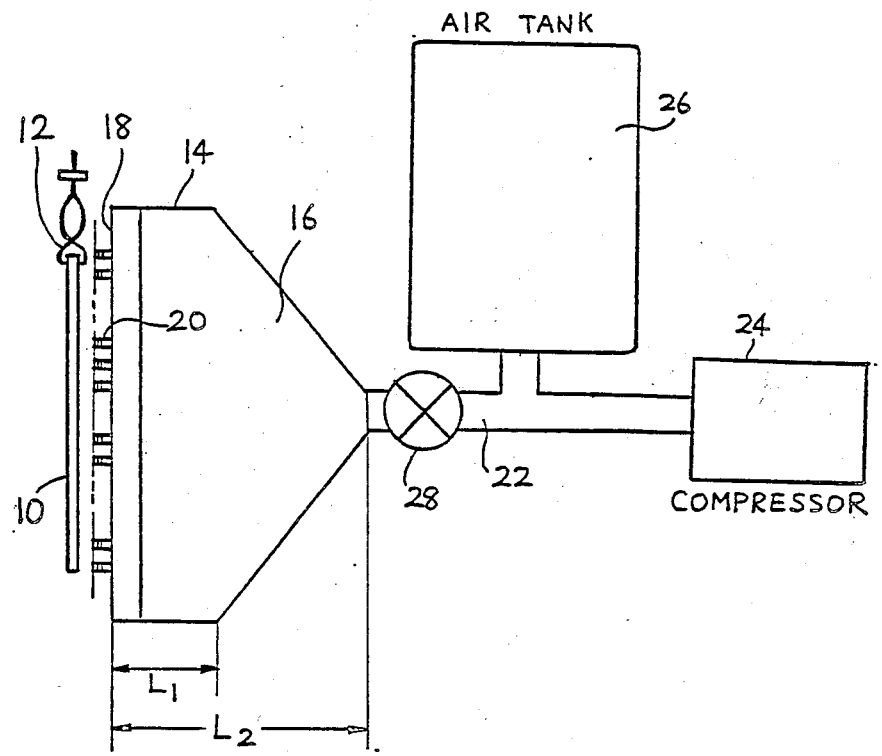

METHOD OF TEMPERING GLASS SHEET BY AIR QUENCHING

BACKGROUND OF THE INVENTION

This invention relates to a method of tempering a glass sheet for use, for example, as an automobile side or rear window by heating the glass sheet to a temperature above the strain point and quenching the heated glass sheet by directing cooling air jets onto both surfaces of the glass sheet.

The quenching of the glass sheet produces a center-to-surface temperature gradient through the thickness of the glass sheet and results in that permanent compressive stresses are produced in the surface layers of the glass sheet, with compensating tensile stresses in the center of the glass thickness. The tempered glass sheet is expected to break up into small and not very dangerous particles of glass when it is fractured by accident.

As to tempered glass sheets for use as automobile side or rear windows, there are official regulations which specify the manner of fragmentation of the tempered glass sheets. Such regulations commonly require that fracture of a tempered glass sheet should not produce dangerously large or elongated particles of glass. For example, British and European Economic Community (EEC) standards basically prohibit the presence of particles longer than 60 mm in which the length is not less than four times the width. Such particles are referred to as "splines". Besides, the same standards specify that the number of particles included in any 50 mm×50 mm square traced on the glass sheet (except in specified marginal areas and a specified circular area around the point of impact) should be within a limited range, such as from 60 to 400, and further specify a maximum permissible area of each particle, such as 300 mm².

In the recent automobile industry a matter of important concern is reducing the vehicle weight. Accordingly there is a growing demand for tempered glass sheets of reduced thickness for use as side and rear windows. However, glass sheets less than about 3 mm in thickness are difficult to temper by the conventional air quenching method as so to comply with the aforementioned standards, primarily because of difficulty in creating and maintaining a suitable gradient of temperature in the thickness direction of the thin glass sheets during the quenching process.

With a view to satisfactorily tempering relatively thin glass sheets less than about 3 mm in thickness by air quenching, some proposals have been made for enhancement of the cooling efficiency. U.S. Pat. No. 4,578,102 proposes directing jets of a mixture of air and atomized water onto the heated glass surfaces by means of Laval nozzles. Air is supplied to the Laval nozzles at such a pressure that the jet velocity at the exit of each nozzle becomes at least sonic, while water is introduced from a radial direction into the constricted throat section of each nozzle to accomplish atomization of water and mixing of the atomized water with air within the divergent cone section of the nozzle. The mixture of air and atomized water has a higher specific heat than air alone. It is intended to rapidly extract heat from the glass sheet surfaces by using such high-velocity and high-specific heat two-phase jets. However, from a practical point of view this method is rather inconvenient and has some disadvantages. First, the necessity of using water besides air offers complicacy. Besides, very high precision of the equipment is required for complete atomization of water into a fine mist by using Laval nozzles and for thorough mixing of the atomized water with air during the transfer of the two fluids from the nozzle throat to the nozzle exit. Naturally a heavy cost is entailed. Furthermore, the relative pressure of air supplied to the nozzles must be at least 0.91 bar (about 0.93 kg/cm²) in order to enable the jet velocity at the exit of the nozzles to be sonic. Despite the complicacy of the equipment and operation, still it is difficult to eliminate the possibility of relatively large droplets of water hitting the heated glass sheet to cause the glass to break.

Japanese patent application primary publication No. 60-145921 relates to tempering of a glass sheet by directing jets of air from quenching nozzles onto the heated glass sheet surfaces, and proposes to determine the air pressure and the nozzle configuration such that the maximum drop of the cooling air pressure takes place at the exit of each nozzle whereby the air jet velocity at the nozzle exit becomes sonic. The quenching nozzles used in this method are straight nozzles narrowed at the exit so as to form a small orifice, and the pressure of cooling air supplied to the nozzles is at least 0.9 bar (about 0.92 kg/cm²) by gauge pressure. A disadvantage of this method is that fluctuations of the air supply pressure in the quenching equipment are liable to be transmitted to the glass sheet surfaces so that the heated glass sheet under quenching is liable to be distorted, particularly when the glass thickness is less than 3 mm. Besides, in this method it will be necessary to give very careful consideration to the arrangement of the quenching nozzles on a plane parallel to the glass sheet.

SUMMARY OF THE INVENTION

It is an object of the present invention to provide an improved method of tempering a glass sheet, which may be for use as an automobile side or rear window and may be as thin as about 1.5–3 mm, by quenching with air jets ejected from simple nozzles.

This invention provides a method of tempering a glass sheet, which has the steps of heating the glass sheet to a temperature above the strain point of the glass and quenching the heated glass sheet by directing jets of cooling air onto both surfaces of the heated glass sheet from two sets of nozzles protruding from oppositely disposed two air chambers, respectively. According to the invention, at the start of the quenching step each air chamber is suddenly allowed to communicate with a source of compressed air maintained at a predetermined first pressure, which is in the range from 2 to 8 kg/cm² by gauge pressure, such that a rapid drop in pressure from the first pressure to a predetermined second pressure in the range from 0.05 to 0.5 kg/cm² by gauge pressure takes place as the compressed air expands into the air chamber and such that substantially the whole length of each air chamber and the nozzles protruding therefrom serves as a sort of shock wave tube.

The quenching by this method can be accomplished by using simple nozzles such as, for example, substantially straight nozzles. Each of the air chambers used in this method has a capacity sufficient to maintain therein the predetermined second pressure almost unchanged at least for a predetermined length of time, which is not less than 3 sec and may be 5 to 15 sec.

As the compressed air rapidly expands into each air chamber with a sudden drop in pressure, a shock wave is formed at a section close to the entrance to the air chamber and propagates through the air chamber and the nozzles. By virtue of the propagated shock wave, the jets of air directed to the glass sheet by the nozzles have high kinetic energy at the initial stage of impingement on the glass sheet surfaces. Therefore, a heat transfer suppressive laminar film that exists on each surface of the heated glass sheet is immediately broken up or diminished in thickness, and heat is rapidly and efficiently dissipated or extracted from both surfaces of the glass sheet. Thus, the initial cooling power of the air jets is remarkably enhanced without greatly increasing the nozzle pressure.

Glass sheets of various thicknesses can be well tempered by the method according to the invention. Even thin glass sheets with thickness ranging from about 3 mm to about 1.5 mm can be tempered by this method so as to meet the current regulations on tempered glass sheets for use as automobile side or rear windows. Furthermore, this tempering method is applicable to the production of tempered glass sheets for various uses such as train or other vehicle window panes, building window panes and electronic device substrates.

It is also an important merit of the method according to the invention that distortion or deformation of the quenched glass sheet and probability of break of the quenched glass sheet greatly reduce because pulsation of the pressure of air supplied to the nozzles is small so that the glass sheet under quenching is scarcely swayed. This is particularly valuable in the cases of tempering thin glass sheets since, in general, liability of glass sheet to deformation or distortion augments approximately inversely proportional to the square of thickness.

BRIEF DESCRIPTION OF THE DRAWING

The single FIGURE is a schematic presentation of a quenching apparatus used in a glass sheet tempering method according to the invention.

DETAILED DESCRIPTION OF THE INVENTION

In tempering a glass sheet by a method according to the invention the first step is uniformly heating the glass sheet to a temperature above the strain point of the glass and slightly below the glass softening temperature, e.g. to 600°–700° C. This is similar to the heating treatment in the conventional glass sheet tempering methods. Uniformity in thickness of the glass sheet is important for achievement of desired tempering, and the importance of uniform thickness augments when tempering glass sheets thinner than about 2.5 mm. The heated glass sheet is soon carried into the quenching station.

To ensure that the glass sheet has an appropriately elevated temperature at the start of quenching with air jets, it is desirable to reheat a central region of the already uniformly heated glass sheet for a short period of time by using a suitable heating means such as a press heater. The area of the central region to be reheated is about 40–70% of the entire area of the glass sheet. The favorable effect of such reheating on the degree of tempering of the glass sheet augments as the thickness of the glass sheet reduces.

The FIGURE shows the outline of an example of quenching apparatus for use in the present invention. Numeral 10 indicates a glass sheet to be tempered, which is already heated as mentioned above. The glass sheet 10 is carried vertically by tongs 12 suspended from hoist means (not indicated) and is held in position for equenching. Since it is intended to direct jets of cooling air onto both surfaces of the heated glass sheet 10 the quenching apparatus has oppositely arranged two identical sets of air jetting systems, though the FIGURE shows only one air jetting system arranged on the right-hand side of the glass sheet 10. The glass sheet 10 is positioned between and in the center of the two air jetting systems.

On each side of the glass sheet 10 there is a blasthead 14 which defines therein an air chamber 16 and has a faceplate 18 opposite and parallel to the glass sheet 10. In the case of tempering a curved glass sheet the faceplate 18 too is curved. A number of nozzles 20 protrude from the faceplate 18 perpendicularly toward the glass sheet 10. These nozzles 20 communicate with the air chamber 16. In plan view the nozzles 20 are arranged on the faceplate 18 in a suitable pattern such as, for example, a lattice pattern or a concentrically circumferential pattern. The distance between adjacent two nozzles is usually 20–50 mm. The nozzles 20 used in this invention are simple in configuration, such as substantially straight nozzles or slightly tapering nozzles with the minimum diameter at the exit. It is unsuitable to use nozzles constricted at an intermediate section. The nozzles 20 have a relatively small diameter, usually several millimeters, so that the total area of the nozzles 20 is not more than $\frac{1}{3}$ of the surface area of the faceplate 18. The distance between the glass sheet 10 and the end of the nozzles 20 is usually several centimeters.

A gas passage 22 connects the air chamber 16 to a compressor 24, and there is an air tank 26 which is also connected to the compressor 24 and can communicate with the air chamber 16 via the passage 22. At a section between the air tank 26 and the air chamber 16 and close to the inlet to the air chamber 16, the passage 22 is provided with a throttle means 28 which can completely block up the passage 22 to separate the air chamber 16 from the compressor 24 and the air tank 26 and can quickly open the passage 22 to any degree. The throttle means 28 may be either a manually operatable means or an automatic means, though it is preferable to employ an automatic throttle means which opens the passage 22 in response to setting of the heated glass sheet 10 in the predetermined position between the two blastheads 14.

Throughout the following description every value of air pressure refers to gauge pressure.

Before carrying the heated glass sheet 10 into the quenching station the compressor 24 is operated to accumulate pressurized air in the air tank 26 in each air jetting system, while the throttle means 28 is kept closed to leave the air chamber 16 in each blasthead 14 substantially at the atmospheric pressure. The air pressure in each air tank 26 is controlled to a predetermined first pressure which is in the range from 2 to 8 $kg/cm^2$.

When the heated glass sheet 10 is set in position between the two blastheads the throttle means 28 is opened to suddenly release the pressurized air in each air tank 26 from confinement. Then the pressurized air rushes into the air chamber 16 in each blasthead 14 and undergoes a sudden and considerable reduction in pressure at the entrance to the air chamber 16, while the atmospheric air existing in the air chamber 16 is rapidly compressed. Consequently a shock wave is generated at a section close to the entrance to the air chamber 16, and the shock wave propagates through the air chamber 16 and the nozzles 20. The capacities of the air tank 26 and the air chamber 16 and the degree of opening of the throttle means 28 are such that the expansion of the pressurized air into the air chamber 16 results in a rapid drop in air pressure to a predetermined second pressure which is in the range from 0.05 to 0.5 kg/cm$^2$. Soon air begins to jet out from the nozzles 20 of each blasthead 14 to collide against the heated glass sheet 10. At the initial stage the air jets arrive at the glass surfaces with high kinetic energy which is attributed to the propagation of the shock wave through the air chamber 16 and the nozzles 20. Accordingly the air jets are effective in quickly breaking a heat transfer suppressive laminar film that exists on each surface of the heated glass sheet 10 and thereby promoting dissipation of heat from the glass sheet 10 into the atmosphere. That is, air jets directed to the glass sheet at the initial stage of this quenching method are very high in the heat extracting or cooling capability. The delivery of cooling air onto the glass sheet surfaces continue for several seconds though the kinetic energy of the air jets soon lowers from the initial high level. As mentioned hereinbefore, the capacity of each air chamber 16 is sufficient to maintain the reduced air pressure, in the range from 0.05 to 0.5 kg/cm$^2$, almost unchanged at least for 3 sec and preferably for 5–15 sec. In another aspect, it is suitable that the volume of each air chamber 16 is at least 10 times the total volume of the nozzles 20 on each nozzles 20 on each blasthead 14.

During this quenching operation each blasthead 14 is oscillated parallel to the glass sheet 10 usually vertically or horizontally and sometimes arcuately, as is often done in the conventional air quenching methods. This is for the purpose of macroscopically uniformly quenching the glass sheet 10. The amplitude of the oscillation is usually slightly greater than the distance between adjacent two nozzles 20 on the faceplate 18.

In the quenching method according to the invention the reduced pressure of air in each air chamber 16 is limited within the range from 0.05 to 0.5 kg/cm$^2$. If this air pressure is lower than 0.05 kg/cm$^2$ it is difficult to accomplish sufficient tempering of the glass sheet. On the other hand, if this air pressure is higher than 0.5 kg/cm$^2$ the quenching operation is liable to result in either fracture of the glass sheet, which may be thinner than 3 mm and is in a heated and fragile state, or deterioration of the optical characteristics of the tempered glass sheet. A preferred range of the reduced air pressure in each air chamber 16 is from 0.1 to 0.4 kg/cm$^2$. The primary air pressure in each air tank 26 is limited within the range from 2 to 8 kg/cm$^2$. If this air pressure is lower than 2 kg/cm$^2$ it is impossible to realize a sudden drop of a sufficient magnitude in air pressure, and therefore it is impossible to enhance the initial cooling power of air jets directed from the nozzles 20 onto the heated glass sheet. It is unnecessary and uneconomical to raise the primary pressure in the air tank 26 beyond 8 kg/cm$^2$. The primary air pressure and the magnitude of the sudden drop in air pressure are selectively determined according to the thickness of the glass sheet and the desired degree of toughening of the glass sheet.

Desired tempering of the glass sheet 10 is accomplished by the above described quenching operation even when the glass sheet is as thin as about 1.5 mm. At the quenching operation the glass sheet is not necessarily held vertically, and may alternatively be held horizontally. Optionally the above described quenching operation according to the invention may be followed by a known quenching operation in which supplemental air is supplied to each air chamber 16 from a blower (not shown) after blocking the communication between the air chamber 16 and the air tank 26.

EXAMPLES 1–6

In every example a 500 mm×300 mm wide rectangular sheet of glass was tempered by a method according to the invention. The thickness of the glass sheet was variable: 1.5 mm in Examples 1 and 4, 2.3 mm in Examples 2 and 5, 2.5 mm in Example 6, and 2.9 mm in Example 3.

In the quenching apparatus used in these examples, the blastheads were generally of the shape shown in the FIGURE. The nozzles 20 were substantially straight nozzles having an inner diameter of about 3.5 mm. On the faceplate 18 of each blasthead the nozzles were arranged in a lattice pattern. The distance between adjacent two nozzles was about 30 mm in the horizontal direction and about 25 mm in the vertical direction. The faceplate 18 was about 700 mm×500 mm in widths. Referring to the FIGURE, length $L_1$ of the straight section of the air chamber 16 was about 300 mm and length $L_2$ of the tapered section was about 600 mm.

In every example the glass sheet was carried into the quenching station soon after heating in a furnace so as to accomplish quenching while the glass sheet has a temperature of 670–°700° C. The glass sheet was held vertically between the two blastheads. In advance, compressed air was accumulated in the air tank 26 for each blasthead 14. As shown in the following table the primary air pressure in the air tanks 26 was controlled to 8 kg/cm$^2$, 7 kg/cm$^2$ or 2 kg/cm$^2$. At the start of quenching operation the throttle means 28 for each blasthead was opened such that the pressurized air rapidly expanded into the air chamber 16 with rapid drop in pressure to 0.5, 0.3 or 0.05 kg/cm$^2$. Delivery of cooling air jets from the nozzles 20 continued for more than 10 sec. During an initial period of about 5 sec the pressure in each air chamber 16 remained almost unchanged from the initially produced pressure, viz. 0.5, 0.3 or 0.05 kg/cm$^2$. In 10 sec the pressure in each air chamber 16 reduced to about ½ of the initially produced pressure. During the quenching operation each blasthead 14 was oscillated upward and downward at a rate of 50–80 cycles/min. The amplitude of oscillation was about 40 mm.

The tempered glass sheets obtained in Examples 1–6 were subjected to a fragmentation test as described hereinafter.

COMPARATIVE EXAMPLES 1–4

The glass sheets tempered in these comparative examples were identical with the one used in Example 6. The tempering method and the quenching apparatus were as described in Examples 1–6 except that the primary pressure of air in the air tanks 26 and/or the reduced pressure of air in the air chambers 16 were varied as shown in the table. The tempered glass sheets obtained in Comparative Examples 1–4 too were subjected to the fragmentation test.

COMPARATIVE EXAMPLES 5–7

The glass sheets tempered in these comparative examples were identical with either the one used in Example 3 or the one used in Example 6, as shown in the table. In these experiments the quenching apparatus was modified by connecting each air chamber 16 to a blower without using the compressor 24 and the air tank 26. At the quenching operation, air was continuously supplied from each blower to the nozzles 20 substantially at a constant pressure, which was 0.3 or 0.25 kg/cm² as shown in the table. The tempered glass sheets obtained in Comparative Examples 5-7 too were subjected to the fragmentation test.

FRAGMENTATION TEST

The test procedure was generally in accoredance with British Standard BS 5282. The point of impact on each sample of the tempered glass sheets was at the approximate center of the rectangular glass sheet ("A" in the following table) or at a distance of 100 mm from the middle point of a longer side of the glass sheet toward the center ("B" in the table). The fragmentation was checked by counting the number of particles included in each of many arbitrarily traced 50 mm × 50 mm square areas of the tested glass sheet and the total number of elongated particles (splines) which were longer than 60 mm and in which the length was at least four times the width. However, fragmentation was not checked in a strip 20 mm wide all round the edge of the glass sheet, and within a radius of 75 mm around the point of impact. The test results were as shown in the following table.

|  | Primary Air Pressure (kg/cm²) | Pressure of Air Fed to Nozzles (kg/cm²) | Glass Sheet Thickness (mm) | Point of Impact | Fragmentation Test Result | | Number of Elongated Particles |
|---|---|---|---|---|---|---|---|
|  |  |  |  |  | Particle Count (in 50 mm × 50 mm square) | |  |
|  |  |  |  |  | Max. | Min. |  |
| Ex. 1 | 8 | 0.5 | 1.5 | A | 221 | 63 | 0 |
| Ex. 2 | 7 | 0.3 | 2.3 | A | 260 | 83 | 0 |
| Ex. 3 | 2 | 0.05 | 2.9 | A | 203 | 66 | 0 |
| Ex. 4 | 8 | 0.5 | 1.5 | B | 188 | 87 | 0 |
| Ex. 5 | 7 | 0.3 | 2.3 | B | 199 | 81 | 0 |
| Ex. 6 | 7 | 0.3 | 2.5 | A | 330 | 168 | 0 |
| Comp. Ex. 1 | 1 | 0.2 | 2.5 | A | 4 | 1 | 0 |
| Comp. Ex. 2 | 1 | 0.2 | 2.5 | B | 4 | 1 | 0 |
| Comp. Ex. 3 | 7 | 0.03 | 2.5 | A | 3 | 1 | 0 |
| Comp. Ex. 4 | 7 | 0.03 | 2.5 | B | 3 | 1 | 0 |
| Comp. Ex. 5 | 0.3 | 0.3 | 2.5 | A | 30 | 2 | 1 |
| Comp. Ex. 6 | 0.25 | 0.25 | 2.9 | A | 240 | 53 | 5 |
| Comp. Ex. 7 | 0.25 | 0.25 | 2.9 | B | 166 | 67 | 1 |

The fragmentation of the tempered glass sheets obtained in the foregoing examples and comparative examples was further tested by the test methods specified in Japanese Industrial Standard JIS R 3212 and in the EEC Standard. The results of these supplementary tests were nearly equivalent to the test results shown in the above table.

What is claimed is:

1. A method of tempering a glass sheet, the method having the steps of heating the glass sheet to a temperature above the strain point of the glass and quenching the heated glass sheet by directing jets of cooling air onto both surfaces of the heated glass sheet from two sets of nozzles protruding from oppositely disposed two air chambers, respectively, characterized in that at the start of the quenching step each air chamber is suddenly allowed to communicate with a source of compressed air maintained at a predetermined first pressure in the range from 2 to 8 kg/cm² by gauge pressure such that a rapid drop in pressure from said first pressure to a predetermined second pressure in the range from 0.05 to 0.5 kg/cm² by gauge pressure takes place as the compressed air expands into the air chamber and such that substantially the whole length of each air chamber and the nozzles protruding therefrom serves as a sort of shock wave tube.

2. A method according to claim 1, wherein said second pressure is in the range from 0.1 to 0.4 kg/cm² by gauge pressure.

3. A method according to claim 1, wherein the capacity of each air chamber is such that the pressure in the air chamber is maintained nearly at said second pressure at least for 3 sec.

4. A method according to claim 1, wherein said nozzles are substantially straight nozzles.

5. A method according to claim 1, wherein said nozzles are taper nozzles with the minimum cross-sectional area at the exit thereof.

6. A method according to claim 1, wherein the thickness of the glass sheet is not more than 3 mm.

* * * * *